Figure 1:
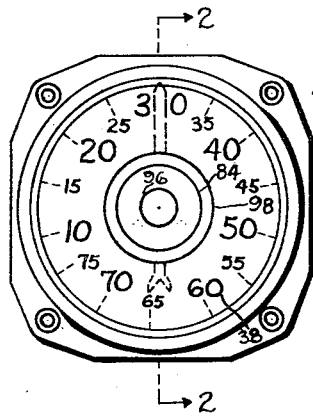

Dec. 4, 1956 G. V. AMICO 2,772,651
INSTRUMENT ILLUMINATOR
Filed Aug. 21, 1952 4 Sheets-Sheet 1

INVENTOR
GAETANO V. AMICO
BY
D.C. Snyder
R.J. Tompkins
ATTORNEYS

Dec. 4, 1956     G. V. AMICO     2,772,651
INSTRUMENT ILLUMINATOR

Filed Aug. 21, 1952     4 Sheets-Sheet 2

INVENTOR
GAETANO V. AMICO
BY
*D. C. Snyder*
*R. J. Tompkins*
ATTORNEYS

Dec. 4, 1956 G. V. AMICO 2,772,651
INSTRUMENT ILLUMINATOR
Filed Aug. 21, 1952 4 Sheets-Sheet 3

INVENTOR
GAETANO V. AMICO
BY
ATTORNEYS

Dec. 4, 1956  G. V. AMICO  2,772,651
INSTRUMENT ILLUMINATOR
Filed Aug. 21, 1952  4 Sheets-Sheet 4

INVENTOR
GAETANO V. AMICO
BY
ATTORNEYS

United States Patent Office 2,772,651
Patented Dec. 4, 1956

2,772,651

INSTRUMENT ILLUMINATOR

Gaetano V. Amico, Levittown, N. Y., assignor to the United States of America as represented by the Secretary of the Navy Application August 21, 1952, Serial No. 305,719

11 Claims. (Cl. 116—129)

(Granted under Title 35, U. S. Code (1952), sec. 266)

The invention described herein may be manufactured and used by or for the Government of the United States of America for governmental purposes without the payment of any royalties thereon or therefor.

This invention relates to the lighting of instruments and is directed to an integral instrument device whereby the panel is uniformly lighted and is clearly visible by the person at all times. While the invention will be described in relation to aircraft instruments for uniformity of description, it is to be understood that the device is adapted for wide use and can readily be employed with automobile instrument panels, clocks, ship instruments, etc. Accordingly, it is evident that the invention is not limited to the accompanying description.

Lighting the instrument panel so that the instruments will be clearly visible to the pilot during night flights has always presented a problem. Attempts to solve this have been inadequate. Originally, plastic inserts in the instruments together with a source of light derived from instrument lamps that were embedded in the plastic was attempted. This proved to be inadequate since the distribution of light on the instruments was not uniform and glare occurred when the instrument was observed from an angle. The use of ultra-violet lighting produced undesirable effects, such as fluorescence of the canopy. Recently, edge lighted plastics were tried, but such experiments were failures, too. This was due to many factors, such as difficulty in changing instrument panel arrangements, glare, poor light distribution on the panel, the critical nature of light location and masking and contouring of the plastic to provide a fairly adequate distribution of light.

All of the above limitations are avoided by the instant invention. In this device, modification of the basic instrument mechanism is not required to obtain proper lighting.

An object of the invention is to provide a lighting device whereby an instrument panel may be adequately and uniformly lighted.

Another object of the invention is to provide a device that is adapted for use with present installations without necessitating extensive changes in the design of said installations.

And another object of the invention is to provide means whereby light is reflected both on the edge, face and back of the dial for efficient observation.

Yet another object of the invention is to provide an instrument wherein the light unit is readily replaceable in a minimum of time.

Still another object of the invention resides in avoiding glare, thereby enabling the pilot to observe the reading at any time and from any angle.

Yet another object of the invention relates to methods of supplying the necessary power to operate the instrument lighting device.

A more specific object of the invention is to illuminate the pointer at all times so that the user thereof may depend on adequate visual observation during the reading thereof.

And yet another object of the invention is to provide a device that is simple and durable in construction and is inexpensive to manufacture.

Figure 3:
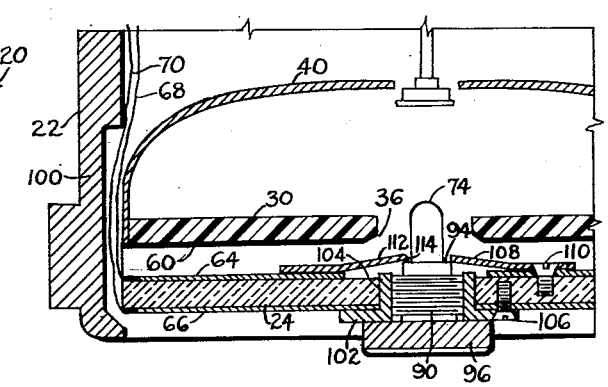
Figure 2:
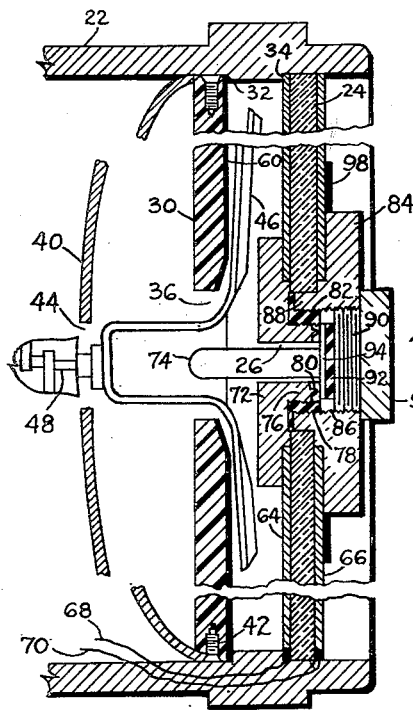
Figures 4, 5:
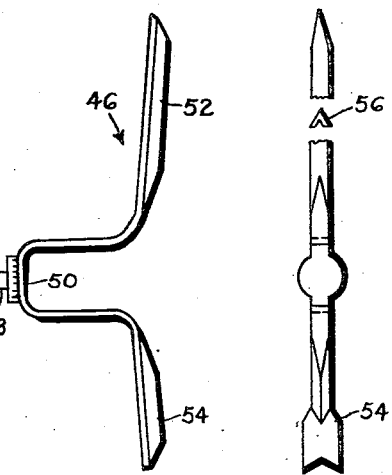
Figure 6:
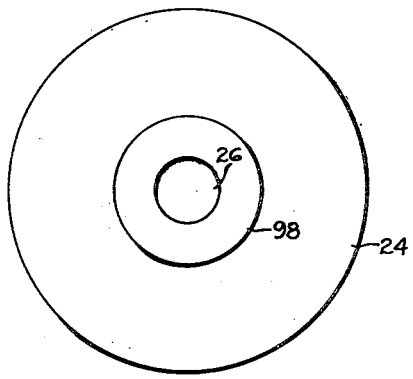
Figure 14:
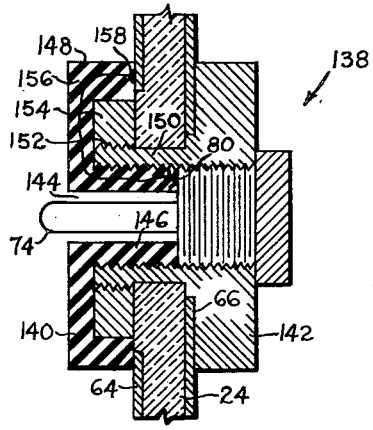
Figure 15:
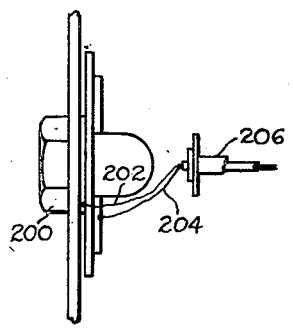
Figure 7:
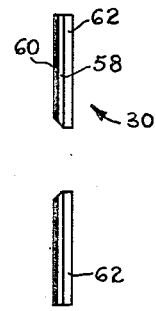
Figure 16:
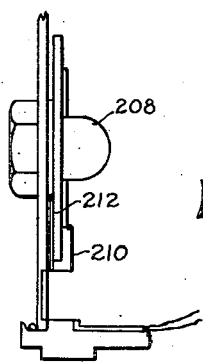
Figure 10:
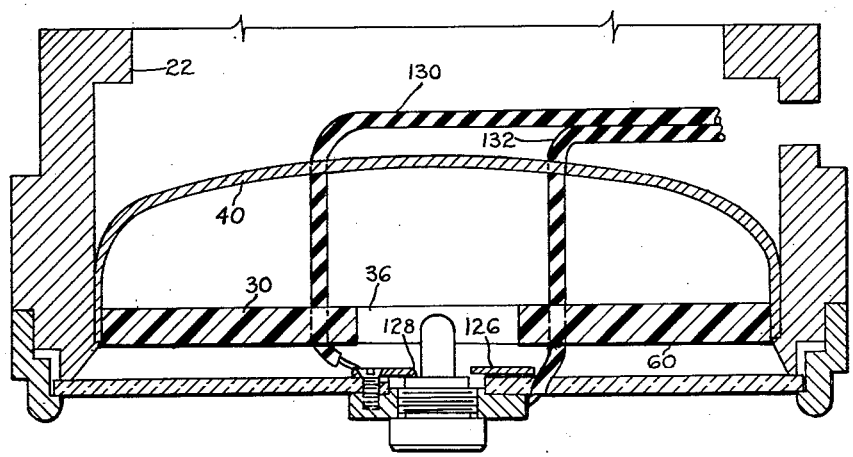
Figures 8, 9:
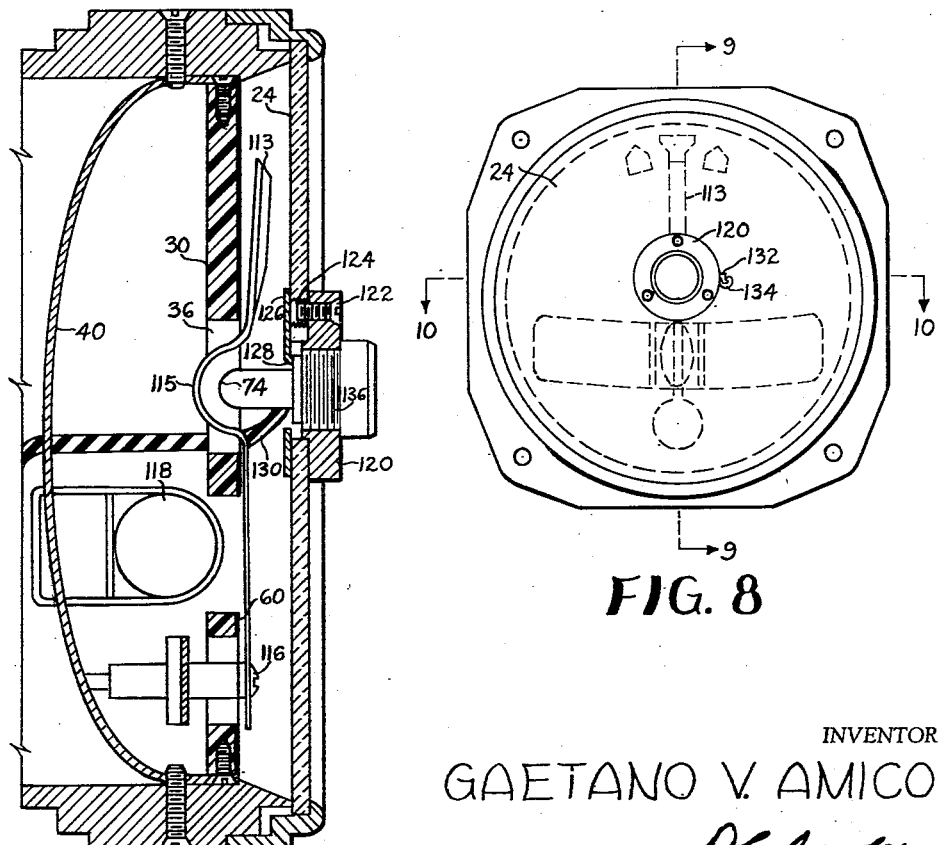
Figure 11:
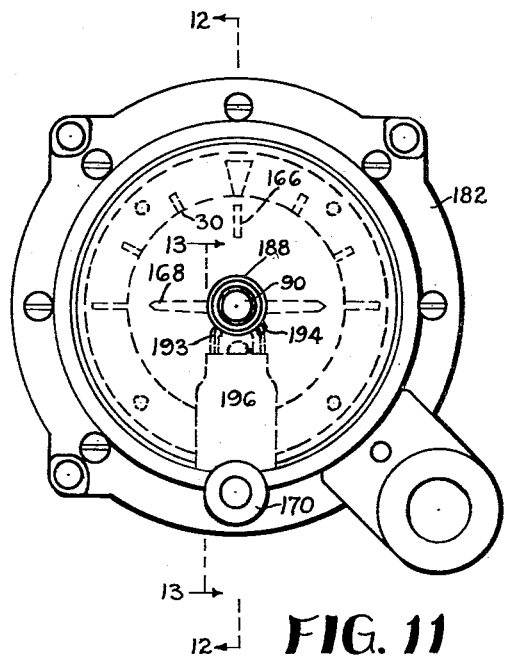
Figure 12:
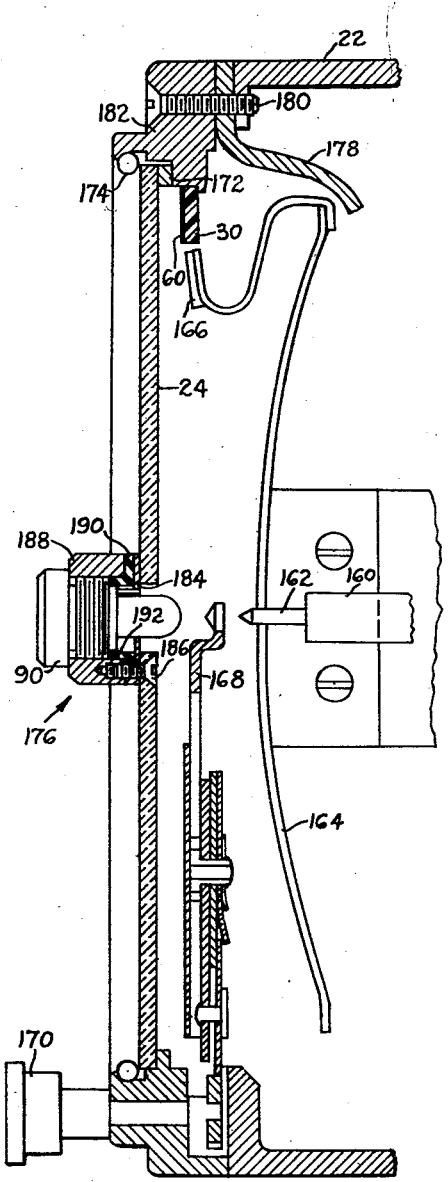
Figure 13:
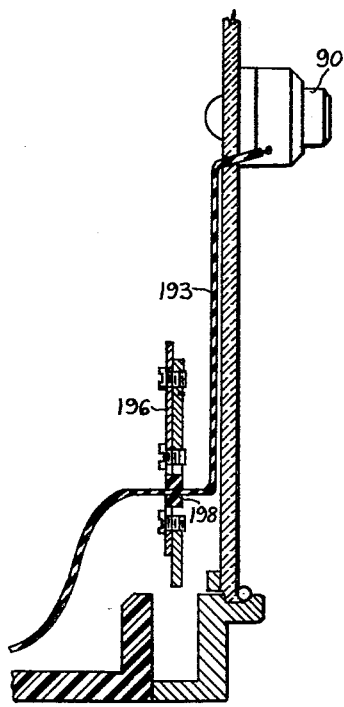

Other objects and many of the attendant advantages of this invention will be readily appreciated as the same becomes better understood by reference to the following detailed descriptions when considered in connection with the accompanying drawings wherein:

Fig. 1 discloses an instrument dial to which the invention is applied and which includes a preferred form of light housing and electrical connections therefor, Fig. 2 is a vertical sectional view of the dial taken along the line 2—2 of Fig. 1, and illustrates the invention in detail, Fig. 3 is an enlarged fragmentary section of the invention, but showing another method of constructing the novel lighting assembly, Figs. 4 and 5 are side and front elevations of the indicator or pointer employed, Fig. 6 illustrates a modification of the manner in which the glass window is coated to avoid glare, Fig. 7 is an enlarged showing of the manner in which the dial is constructed, Fig. 8 illustrates another instrument dial lighted in the manner of the invention, Fig. 9 is a vertical, sectional view of the dial and is taken on lines 9—9 of Fig. 8, Fig. 10 is a horizontal sectional view and is taken on lines 10—10 of Fig. 8 and illustrates the wiring connections, Fig. 11 is a front elevation of another type of instrument dial illustrating a further application of the invention, Fig. 12 is a vertical section taken along lines 12—12 of Fig. 11, Fig. 13 is a section taken on lines 13—13 of Fig. 11, Fig. 14 is a further modification of the lighting assembly construction and is shown as a vertical section, Figs. 15 and 16 represent other modifications in the provision of current supply means to light the device.

Referring now to the invention illustrated in Figs. 1, 2, 4 and 5, 20 discloses a manifold pressure instrument dial, although over similar instruments such as tachometers or air speed indicators could be readily used. Casing 22 is adapted to retain a window 24 of glass or other suitable material in any desired manner. Window 24 is especially treated, as will soon be explained, and is centrally apertured at 26 to receive lighting assembly 28. Dial 30 is mounted in spaced parallel relation to window 24 in casing 22 and is retained against shoulder 32 of said casing in a manner similar to shoulder 34 for window 24. Dial 30 is axially apertured at 36 in alignment with window aperture 26 to receive therethrough a portion of the lighting assembly. Dial 30 is preferably of plastic construction for durability and ease in handling, although other material may be substituted, if preferred. Dial 30 is marked around its periphery by numerals 38 to indicate the manifold pressure and is especially designed to provide maximum reflection of the light provided by assembly 28.

A rearwardly positioned arcuate reflector 40 of any suitable material, such as aluminum or stainless steel, is secured at its perimeter to dial 30 as by screws 42 and is also centrally apertured at 44 to receive therethrough a pointer 46. Shaft 48 extends rearwardly from pointer or indicator 46 through reflector aperture 44 to the instrument mechanism (not shown).

Pointer or indicator 46 is in the shape of an arrow with the medial section 50 bent into U-shape, as is illustrated in Figs. 2, 4 and 5. This enables the needle portion 52 and tail portion 54 to extend through aperture 36 to be positioned between the dial and instrument window and to still provide the required space for the bulk of light assembly 28 to be positioned behind dial 30. The needle and tail sections are of V-shaped cross-section, as can be seen at 56 in Fig. 5. Needle 52 is also slanted forwardly at a slight angle to the vertical and towards the window of the instrument. Such construction is of distinct advantage, since the V-shape and forward slant enables light to be reflected upwardly on indicator 46 and assists in keeping it uniformly lighted.

Dial 30 consists of a 3-layer plastic material, as is illustrated in Fig. 7 with the middle, translucent layer 58 retaining outer black coating 60 thereon. The dial markings 38 are cut through the black layer and into, but not through, translucent layer 58. A clear plastic backing layer 62 is provided to keep the device rigid. The layers of material that comprise dial 30 are shown in Fig. 7 in greatly exaggerated thicknesses, for purposes of clarity of illustration. Obviously, the dial construction may be modified without departing from the inventive concept. For example, it is possible to construct translucent layer 58 of sufficient rigidity so that reinforcing means is not necessary and provision of a backing layer 62 is thus eliminated.

Window glass 24 is specially treated so that electrical current can be supplied to lighting assembly 28 without obscuring vision of the dial and indicator. Instrument window 24 is coated on both sides by a suitable conductive coating such as a transparent, microfilm layer of tin illustrated at 64 and 66. Lead wires 68 and 70 are connected to the layers 64 and 66 on the window 24. These wires extend through casing 22 towards the rear of the instrument for suitable connection with a source of power. Many methods of securing the wires to the periphery of the instrument window are possible. The simplest involves securing the wires directly to the coated glass. This is often difficult, since a good solder connection is not always feasible. To avoid such difficulty, a peripheral layer of copper or silver, or a combination of both may be used, with the ends of wires 68 and 70 securely connected at the peripheral layer of conductive material to allow current to pass through the microfilm coating on the glass to the lighting assembly. The use of a conductive coating on the window is of distinct advantage in all types of instruments as it dissipates heat and static, ordinarily a condition met in the devices used today. It is especially desirable where the instrument contains 360 degree markings, since it now is possible to provide electrical current to the lighting assembly without obliterating any portion of the dial.

A preferred form of lighting assembly 28 is disclosed in Fig. 2, portions of which have been exaggerated in size for clarity, and is particularly adapted for use in the process of uniformly lighting any aeroplane instrument. Retaining collar 72, by virtue of its annular construction is axially apertured to allow lamp bulb 74 to extend therethrough. Collar 72 seats against the inner surface of window 24 and includes an upstanding neck section 76 externally threaded at 78. A resilient spring 80 is secured to the flat surface of neck 76 in order to insure contact with bulb 74 at all times to prevent operational failure due to inaccuracies in machining the component parts of the light assembly. An insulating ring 82, annular in construction and threaded both internally and externally is retained on neck 76 of collar 72. A second annular sleeve or collar 84, is internally threaded at 86 and includes an extended neck section 88 retained by ring 22 to seat against the external surface of instrument window 24. Insulating ring 82 placed between collar 72 and collar 84 insures against short circuiting of the assembly. Lamp 74 is secured on a threaded shank or stem 90, said shank being removably retained in sleeve 84. An insulated surface 92 is provided on a reduced section of stem 90, with spring 80 making contact on metallic surface 94 retaining lamp 74. An external knob 96 extends outwardly from stem 90 and is used to insert or remove the lighting means.

A black coating 98 is provided on either the internal or external surface of window 24 in order to avoid glare due to the reflection of light through the axial aperture. While coating 98 is shown as being painted on the window, it is obvious that any manner of so obscuring light reflections may be substituted. For example, a black coated annular disc of paper, the inner edges thereof retained under members 72 or 84, will provide the same results. In Fig. 6 is illustrated the instrument window 24 per se, with the black coating 98 concentrically painted adjacent the axial aperture 26 through which light assembly 28 extends.

While assembly 28 represents a preferred form of central lighting construction, the invention is not limited to such specific disclosure, but is capable of employing modified constructions without departing from the scope thereof. In Fig. 3 is illustrated such modification. Instrument window 24, coated on both sides at 64 and 66 with conductive material is connected to a source of current by means of lead wires 68 and 70. Reflector 40 is secured to indicator dial 30 in the manner described above. Lead wires 68 and 70, in this instance, are not embedded in casing 22, but are freely maintained within the instrument, through provision of counterbored surface 100 in casing 22 adjacent the front end thereof.

Lamp 74 extends through aperture 36 with the shank portion 90 threaded into a retaining sleeve 102 of electrically conductive material. Sleeve 102 is annular in design and abuts the exterior of instrument window 24. A projecting neck portion 104 of the sleeve extends the thickness of window 24 to provide the shank receiving section. Suitable fastening means, such as screws 106 extend through apertures in sleeve 102 and into, but not through glass window 24 to retain the sleeve in fixed position. It will be noted that conductive coating 64 terminates short of the aperture in glass 24 so that there is no opportunity for short circuiting of the device. An annular metal disc 108 is secured to the inner surface of glass 24 by suitable fastening means 110 and is bowed upwardly in an intermediate portion 112, the intermediate section having securing or fastening lugs or retaining fingers 114 struck out therefrom which are downwardly bent to engage and seat on the metal surface 94 of lamp 74 to provide the other electrical contact. Since disc 108 is resilient, it is retained in proper engagement on surface 94 at all times. Nut or knob 96 enables the lighting assembly to be readily removed and replaced when the life of the lamp is exhausted. Metal surface 94 may be grooved if desired to allow fingers 114 to seat thereon, but this is not necessary, since there is very little chance for failure in using an ordinary annular surface due to the resilient nature of disc 108 tending to keep the contact lugs or fingers in proper engagement with the lighting means.

The use of an axially lighted dial to provide uniform light is shown in slightly modified form in Figs. 8, 9 and 10 as applied to another type of aeroplane instrument, such as the turn and bank indicator. Glass window 24 is also axially apertured to align with axial aperture 36 of dial member 30. Dial 30 secures reflector 40 by suitable fastening means 42, as was previously described. Turn indicator needle 113 is curved centrally into C-shape 115 to extend within aperture 36 just sufficiently to clear lamp 74. The indicator is fastened at 116 for pivotal action as is illustrated by the broken lines in Fig. 8. The curved C-construction described is sufficient since the indicator is secured at 116, rather than to an axial shaft, as is the case in other types of instruments. Inclinometer 118 indicates the position of the aeroplane during a turn.

Collar 120 is adapted to be closely fit into the central aperture of glass window 24 and is retained thereon by fastening screws 122. It is generally more economical in manufacture to avoid threading directly into the glass, and Figs. 9 and 10 illustrate one method whereby such economy is effected. Holes are bored through the glass window at the points where the collar is to be fastened and an annular tube or sleeve 124 is mounted in each of said holes. Tubes 124 are internally threaded and thus are able to receive fastening means 122. Annular disc 126 is secured to the inner face of the glass window with fingers 128 engaging the lighting assembly.

In this embodiment, the conductive coating has not been employed and as a result, disc 126 need not be bowed upwardly, but lies flat against the window surface. Electric current is supplied by means of lead wires 130 and 132 to disc 126 and metal collar 120, respectively. Wire 132 extends through an aperture 134 in window 24 for connection with collar 120. Wires 130 and 132 are drawn through plastic dial 30 as can be seen in Fig. 10. The aperture made necessary in dial 30 can be carefully drilled so that wires 130 and 132 are slightly compressed when drawn through and thus insure against light leaking out; or a grommet or washer may be inserted through which the wires pass, as is seen in Fig. 13 at 198. Lighting assembly unit 136 is secured as was previously described. The wires are led back to a source of current, not shown.

Fig. 14 illustrates another form of lighting assembly adapted for use in an instrument panel. In this embodiment, assembly 138 includes a pair of collar members 140 and 142 adapted to be retained on an instrument window 24. Collar member 140 differs from collar 142 in that the former is made of insulated material such as plastic or hard rubber, or some suitable equivalent, while collar 142 is of conventional metallic construction. Collar 140 is bored axially at 144 to receive light bulb 74. In addition, collar 140 includes an elongated annular neck portion 146 extending beyond the horizontal edge and adjacent the central aperture thereof. Collar 140 includes an annular extension flange 148 at the outer edges of the collar and in spaced parallel relation to neck 146. Flange 148 is shorter in length than neck portion 146. Neck portion 146 is threaded to receive a complementary threaded neck portion 150 extending from collar 142. Neck portion 150 abuts window 24 and extends beyond the rear thereof, the extended section being externally threaded at 152 to retain a lock nut 154.

In assembling the device, collar 142 is slid through the window aperture to lie flush against the front face thereof. Lock nut 154 is threaded onto neck 150 to keep the collar seated. Annular collar 140 is then threaded into collar 142 until flange 148 seats on the rear window surface. The annular space between flange 148 and neck 146 is adapted to receive lock nut 154 therein. Lead wire 156 has one of its terminals 158 in contact with the conductive coating 64 on the glass window and then extends through insulating collar 140 to spring contact 80 in a manner similar to the illustration in Fig. 2. In this construction, collar 140 itself acts as the insulating means. The other connection to the lamp 74 is through the medium of the coating 66, metal collar 142 and the metal threaded portion of the removable lamp unit.

The invention is also illustrated as adapted to another type of aircraft instrument, such as the gyro-horizon indicator, in Figs. 11 to 13. Casing 22 contains the conventional gyro mechanisms, such as gyro 160, horizon bar 162, and instrument face 164 mounting bank index pointer 166. Aeroplane member 168 is adjustably mounted as by turn knob 170 and is coated black, as is instrument face member 164. Pointer 166 is coated white for visibility. Spacer washer 172 and snap ring 174 retain glass window 24 in place and casing 22 is made of plastic material, if desired.

Dial 30 extends only around the upper perimeter of the casing and is lighted by assembly 176 from the front face thereof, and from the rear by reflector 178. Reflector 178 is of arcuate shape and extends downwardly from the top of the casing a short distance, sufficient to reflect back light to dial 30. Reflector 178 includes a vertical flange through which fastening means 180 extends to secure the reflector between the casing and the window frame 182.

Lighting assembly 176 is mounted in the central aperture of window 24. Metal plate or disc 184 is secured to the outer face of window 24 by means of screws 186, said screws also serving to retain collar or ring 188. An insulating washer 190 is adapted to seat between disc 184 and ring 188, screws 186 serving to retain all three elements together. A depending annular neck or flange 192 acts as a stop for the threaded stem of the removable lamp unit 90, as well as an insulating means against shorting of the lamp. Wires 193 and 194 are terminated on said lighting assembly by a suitable connection and lead back to the rear of the instrument through the mounting support 196 for the aeroplane representation 168. An insulating grommet 198 is provided to prevent short circuiting of the system.

Other methods of providing current for the lamp of the invention are possible, and will vary with the type of instrument used to avoid obscuring the face thereof. Figs. 15 and 16 illustrate two such methods. In Fig. 15, the threaded removable lamp assembly 200 is connected by wires 202 and 204 to a power source (not shown). A hollow shaft 206 is axially positioned in spaced relation to said lamp to receive wires 202 and 204. Fig. 16 discloses a lamp assembly 208 with wires 210 and 212 embedded directly into window 24 itself. Such embedding feature may may be obtained by cutting one or more grooves in the rear face of the glass or plastic window, or by drilling holes axially through the window between the front and rear surfaces.

The unitary construction of the light assembly enables it to be readily replaced by merely unscrewing knob 96 holding the lamp to remove the entire assembly from the front of the instrument, a distinct advance over existing means whereby the pilot must reach behind the panel to replace worn out bulbs. Further, by centrally locating the light source, a uniform distribution of illumination is obtained, to avoid the necessity for a plurality of spaced lights, as was previously done. There is no possibility of darkened areas with this device, since the edge and front of the dial are lighted directly by lamp 74 and the back is lighted by means of the arcuate reflector surfaces described. It is apparent now that what has been described is advantageous in that a uniform, completely lighted dial is obtained, glare is eliminated and a quick method to replace light bulbs is provided. In addition, by the provision of a dark facing with the numerals being cut into the clear backing material, the white numbers on a contrasting background enables the pilot to easily read the instrument during daylight flight, and the use of a red light bulb provides red numbers against a dark background, ideal in night flying.

Obviously many modifications and variations of the present invention are possible in the light of the above teachings. It is therefore to be understood that within the scope of the appended claims the invention may be practiced otherwise than as specifically described.

What is claimed is:

1. In an instrument device, a housing, an instrument window mounted in said housing, a dial spaced from said instrument window in said housing, a reflector mounted behind said dial, aligned apertures in said window and dial, a lighting assembly secured in said window aperture, said assembly being apertured in axial alignment with said dial and window apertures, and lamp means removably retained in the aperture in said lighting assembly, said lamp extending into said dial aperture to provide uniform edge, back and front illumination of the dial.

2. In an instrument device, a housing, an instrument window mounted in said housing, a dial spaced from said instrument window in said housing, a reflector mounted behind said dial, aligned apertures in said window and dial, a lighting assembly received in said window aperture, said assembly being apertured in axial alignment with said dial and window apertures, lamp means removably retained in the aperture in said lighting assembly, said lamp means extending into said dial aperture to provide uniform edge, back and front illumination of the dial and a pointer including means mounting said pointer in said housing adjacent said dial, said pointer being angled slightly, forwardly towards the window to uniformly reflect light emanating from said lamp means.

3. In an instrument device, a housing, an instrument window in said housing, a dial spaced from said instrument window in said housing, a reflector mounted behind said dial, aligned apertures in said window and dial, a pointer mounted in said instrument between the window and dial, said pointer being angled slightly forwardly towards the window to uniformly reflect light, said pointer being U-shaped medially to provide clearance, a lighting assembly secured in said window aperture, said assembly being apertured in alignment with said dial and window apertures, and a lamp removably retained in said lighting assembly aperture, said lamp extending through said aligned apertures to provide uniform edge, back and front illumination of the dial.

4. The combination of claim 3 wherein said reflector is arcuate in shape and means securing said reflector in said casing.

5. In an instrument device, a housing, an instrument window mounted in said housing, a dial spaced from said instrument window, aligned apertures in said window and dial, apertured collars mounted on the inside and outside of said instrument window aperture, and a lamp removably retained on one collar and extending through said aligned apertures for withdrawal in a direction away from said dial and window.

6. The combination of claim 5 wherein one collar is threaded internally and the other collar is threaded externally, annular insulating means threaded both internally and externally and secured between said collars, and electrical contact means mounted on one collar and engaging the lamp mounted on the other collar.

7. In an instrument device, a housing, an instrument window mounted in said housing, a dial spaced from said instrument window, aligned apertures in said window and dial, apertured collars mounted on the inside and outside of said instrument window aperture, a lamp removably retained on the outside collar and extending through said aligned apertures for withdrawal in a direction away from said dial and window, said instrument device including a reflector mounted behind said dial and a pointer extending through said dial aperture and positioned between said window and dial.

8. In an instrument device, a housing, an instrument window mounted in said housing, a dial spaced from said instrument window, aligned apertures in said window and dial, an annular collar seated on the outer surface of the instrument window, said collar including a neck portion extending through said window aperture, a lamp unit extending through said neck portion and into the dial aperture, means retaining said neck portion and lamp unit in complementary removable relation, a metal surface on said lamp unit, an annular disk secured on the inner surface of said window and engaging said metal surface to provide removable electrical contact between said lamp and disk.

9. The combination of claim 8 wherein said disk is apertured and includes finger means at the edges of the aperture thereof, said fingers engaging the metal surface of the lamp unit.

10. In an instrument device, a housing, an instrument window mounted in said housing, a dial spaced from said instrument window, aligned apertures in said window and dial, an annular collar on the outer surface of said window, said collar including an internally and externally threaded neck portion extending through the window aperture, a lock nut on the external surface of said neck portion, current conducting means on said instrument window, an insulating collar on the inner window surface and threaded on the internal neck portion, lamp means removably held in said outer collar and extending through said window, said lamp means including a metal surface, and current carrying means including a wire extending from the current conducting means through the insulating collar for contact with the metal surface of the lamp means.

11. In an instrument device, a housing, an instrument window mounted in said housing, a dial spaced from said instrument window in said housing, an arcuate reflector mounted behind said dial, axially aligned apertures in said window and dial, a lighting assembly secured on said window and extending through said axial dial aperture, and a lamp retained in said assembly and extending into said axial dial aperture to provide uniform edge, back and front illumination of the dial, said lamp including means secured to said lighting assembly for withdrawing said lamp in a direction away from said dial and window.

References Cited in the file of this patent

UNITED STATES PATENTS

| | | |
|---|---|---|
| 2,128,246 | Hardesty | Aug. 30, 1938 |
| 2,172,765 | Kollsman | Sept. 12, 1939 |
| 2,173,316 | Sproule | Sept. 19, 1939 |
| 2,259,910 | Rylsky | Oct. 21, 1941 |
| 2,262,920 | Carbonara | Nov. 18, 1941 |
| 2,429,420 | McMaster | Oct. 21, 1947 |
| 2,518,726 | Shlenker | Aug. 15, 1950 |
| 2,637,802 | Roper et al. | May 5, 1953 |

FOREIGN PATENTS

| | | |
|---|---|---|
| 411,005 | Germany | Mar. 21, 1925 |
| 423,790 | Germany | Jan. 9, 1926 |